(12) United States Patent
Deiss

(10) Patent No.: US 11,542,113 B2
(45) Date of Patent: Jan. 3, 2023

(54) SEALING TAPE ROLL

(71) Applicant: ISO-Chemie GmbH, Aalen (DE)

(72) Inventor: Martin Deiss, Abtsgmuend (DE)

(73) Assignee: ISO-Chemie GmbH

( * ) Notice: Subject to any disclaimer, the term of this patent is extended or adjusted under 35 U.S.C. 154(b) by 745 days.

(21) Appl. No.: 16/523,212

(22) Filed: Jul. 26, 2019

(65) Prior Publication Data
US 2020/0048022 A1 Feb. 13, 2020

(30) Foreign Application Priority Data

Aug. 7, 2018 (EP) .................................... 18187746

(51) Int. Cl.
| | | |
|---|---|---|
| B65H 18/28 | (2006.01) | |
| B32B 7/03 | (2019.01) | |
| B32B 5/18 | (2006.01) | |
| B32B 27/06 | (2006.01) | |
| C09J 7/26 | (2018.01) | |
| C09J 7/29 | (2018.01) | |

(52) U.S. Cl.
CPC ............... B65H 18/28 (2013.01); B32B 5/18 (2013.01); B32B 7/03 (2019.01); B32B 27/065 (2013.01); *B32B 2305/022* (2013.01); *B32B 2581/00* (2013.01); *B65H 2701/1842* (2013.01); C09J 7/26 (2018.01); C09J 7/29 (2018.01); *C09J 2400/221* (2013.01); *C09J 2400/243* (2013.01)

(58) Field of Classification Search
None
See application file for complete search history.

(56) References Cited

U.S. PATENT DOCUMENTS

| | | | |
|---|---|---|---|
| 2011/0309583 A1* | 12/2011 | Andexer ................... | E06B 1/62 277/630 |
| 2016/0060863 A1* | 3/2016 | Deiss ........................ | E06B 1/62 428/58 |

FOREIGN PATENT DOCUMENTS

| | | |
|---|---|---|
| DE | 10 2009 044558 A1 | 5/2010 |
| DE | 20 2012 101990 U1 | 8/2013 |
| DE | 20 2012 104826 U1 | 3/2014 |
| EP | 1 118 727 A1 | 7/2001 |

OTHER PUBLICATIONS

EP 18 18 7746 Search Report dated Jan. 17, 2019.

* cited by examiner

*Primary Examiner* — Chinessa T. Golden
(74) *Attorney, Agent, or Firm* — Jansson Munger McKinley & Kirby Ltd.

(57) ABSTRACT

A sealing tape roll comprises a sealing tape of flexible, compressible foam with at least one interior barrier layer. The sealing tape is wound up into the sealing tape roll in such a way that a top surface of one turn rests against a bottom surface of an adjacent turn of the sealing tape roll, and side surfaces of the sealing tape form end surfaces of the sealing tape roll. The sealing tape comprises a plurality of foam plies, which are arranged one above the other in a thickness direction between the bottom and top surfaces of the sealing tape. A barrier layer is between each pair of adjacent foam plies. The at least one barrier layer extends over at least 50% of the width of the sealing tape roll between the opposite end surfaces of the sealing tape roll and in a longitudinal direction of the sealing tape.

15 Claims, 3 Drawing Sheets

SEALING TAPE ROLL

FIELD OF THE INVENTION

The invention relates to a sealing tape roll of a sealing tape of flexible, compressible foam with at least one interior barrier layer.

Sealing tapes are used to seal joints between a frame profile, such as that of a window or a door, and a building wall to seal off the joint against air drafts and driving rain. Such sealing tapes are usually wound up into sealing tape rolls under compression for space-saving storage, for transport, and for easier handling during installation. In addition to the permeability to air and the sealing property against driving rain, the resistance of the sealing tape to the diffusion of water vapor is considered one of the substantial properties of a sealing tape. It is generally the diffusion of water vapor in the functional direction of the sealing tape, i.e., in the direction between the interior and exterior sides of the joint to be sealed, which is considered so as to define a diffusion gradient between the interior and exterior sides of the room. To influence the diffusion of water vapor through the sealing tape, at least one barrier layer has been provided on at least one of the side surfaces of the sealing tape or within the sealing tape parallel to these side surfaces. In an installed state of the sealing tape, the barrier layer extends over the entire cross section of the joint between the frame profile and the building wall. A barrier layer of this type has greater resistance to the diffusion of water vapor than the foam of the sealing tape and is therefore able to reduce the diffusion of water vapor through the sealing tape or to create a diffusion gradient between the interior side and the exterior side of the room.

It has been found that the permeability of a sealing tape with respect to water vapor should be considered over relatively long lengths of the sealing tape, Local differences in the water vapor diffusion resistance of the sealing tape, such as those which can readily occur as a result of manufacturing-related situations, for example, lead to the diffusion of water vapor within the sealing tape in a direction toward areas of lower water vapor diffusion resistance. Such diffusion within the sealing tape leads to the result that the diffusion of water vapor through the sealing tape is undesirably high in comparison to that of a sealing tape with a completely homogeneous configuration and can deviate from predetermined nominal values. The same applies to the permeability to air in a similar manner.

SUMMARY OF THE INVENTION

It is an object of the invention to provide a sealing tape wound up into a sealing tape roll with a reliably adjustable water vapor diffusion resistance.

According to an aspect of the present invention, a sealing tape roll comprises a sealing tape of flexible, compressible foam with at least one interior barrier layer. The sealing tape comprises a top surface, a bottom surface, and two side surfaces connecting the top surface and the bottom surface to each other. The sealing tape also comprises a longitudinal direction, which is parallel to the bottom surface and to the side surfaces, and a thickness direction, which is perpendicular to the bottom surface. The sealing tape is wound up into the sealing tape roll around an axis which is transverse to the longitudinal direction of the sealing tape in such a way that the top surface of one turn rests against the bottom surface of an adjacent turn of the sealing tape roll, and the side surfaces of the sealing tape form end surfaces of the sealing tape roll. A width of the sealing tape roll is defined as a distance between one end surface of the sealing tape roll and the opposite end surface. The sealing tape comprises a plurality of foam plies, which are arranged one above the other in the thickness direction between the bottom surface and the top surface of the sealing tape, wherein a barrier layer is accommodated between each pair of adjacent foam plies. The at least one barrier layer extends over at least 50% of the width of the sealing tape roll between the opposite end surfaces of the sealing tape roll and in the longitudinal direction of the sealing tape.

Thus a sealing tape wound up into a sealing tape roll is provided, in which the at least one barrier layer influences the diffusion of water vapor within the sealing tape substantially transversely to a functional direction. In contrast to conventional sealing tapes, however, the at least one barrier layer exerts little or no influence on the diffusion of water vapor in the functional direction of the sealing tape.

The functional direction of the sealing tape is defined as the direction in which the sealing tape insulates and seals the interior side against the exterior side of a room in the area of a joint. Sealing tape rolls are unrolled onto a frame profile or a building wall so that a radially outward-facing surface of the sealing tape roll, i.e., the bottom surface of the sealing tape, rests against the profile or wall. The functional direction therefore extends perpendicular to the side surfaces of the sealing tape and in parallel to the bottom surface of the sealing tape from the interior to the exterior side of the room. The functional direction is thus perpendicular to the longitudinal direction of the sealing tape and perpendicular to the thickness direction of the sealing tape, which is in turn perpendicular to the bottom surface of the sealing tape.

The at least one barrier layer therefore subdivides the sealing tape into two or more plies, which are arranged one above the other in the thickness direction. As a result of the at least one barrier layer lying between the plies, the diffusion of water vapor between these plies within the sealing tape in the thickness direction deviating from the functional direction of the sealing tape is only possible to the extent that the at least one barrier layer permits. Inhomogeneities in the foam material of the sealing tape therefore have at best only a local effect on the water vapor permeability of the sealing tape and do not affect the entire thickness of the sealing tape.

Sealing tape rolls also comprise the advantages of space-saving storage, ease of transport, and ease of handling the sealing tapes. The sealing tape is preferably wound up under compression into the sealing tape roll. The compressed thickness of the sealing tape is preferably less than 25% of the original thickness of the foam. In preferred embodiments, the sealing tape has a compressed thickness of less than 20%, even more preferably of less than 15% and/or greater than 5% of the original foam thickness.

In an expanded state, the sealing tape preferably comprises a substantially rectangular cross section, wherein a width of the sealing tape is defined as a distance between the side surfaces of the sealing tape, a thickness is defined as a distance between the top surface and the bottom surface of the sealing tape, and a length of the sealing tape is defined as a distance in the longitudinal direction. In a cross section perpendicular to the longitudinal direction, the top and bottom surfaces form the wide sides of the sealing tape, and the side surfaces form the narrow sides of the sealing tape in this cross section. The length of the sealing tape is significantly greater than its width and its thickness. Because the side surfaces of the sealing tape form the end surfaces of the sealing tape roll, a width of the sealing tape roll corresponds substantially to the width of the sealing tape. Minor deviations can result from the fact that the side surfaces, after having been wound up under compression into the sealing tape roll, bulge slightly outward. Such deviations will not be considered when the range (in %) is stated over which the at least one barrier layer extends over the width of the sealing tape and of the sealing tape roll. If the at least one barrier layer extends over the entire width of the sealing tape roll, it also extends over the entire width of the sealing tape and vice versa.

An "installed state" of the sealing tape is defined as the state in which the sealing tape is arranged in a joint between a frame element such as a window or door frame and a building wall. The longitudinal direction of the sealing tape then extends around the peripheral joint, and the sealing tape lies flat by its bottom and top surfaces against the frame element and the building wall. One of the side surfaces of the sealing tape is then facing the interior side of the room, and the opposite side surface is facing the exterior side of the room. The functional direction extends from the interior to the exterior side of the room perpendicularly to the side surfaces. The thickness direction of the sealing tape is perpendicular to the bottom surface and extends between the frame element and the building wall.

In a preferred embodiment, the at least one barrier layer extends between the opposite end surfaces of the sealing tape roll and covers at least 75% of the width, more preferably at least 90% of the width of the sealing tape roll. In another preferred embodiment, the at least one barrier layer extends continuously from one end surface of the sealing tape roll to the opposite end surface of the sealing tape roll. The larger the area over which the at least one barrier layer extends between the end surfaces of the sealing tape roll and thus between the side surfaces of the sealing tape, the more completely and more effectively are the plies of the sealing tape, which are arranged one above the other in the thickness direction, separated from each other by the at least one barrier layer. The diffusion of water vapor within the sealing tape in the thickness direction can thus be increasingly reduced. In particular, water vapor is increasingly prevented from diffusing around the at least one barrier layer.

There are many different ways in which the diffusion of water vapor within the sealing tape can be influenced and in which the production of the sealing tape roll can be adjusted to suit the given requirements.

In one embodiment, the at least one barrier layer is centered between the side surfaces. The at least one barrier layer extends only part of the way between the side surfaces of the sealing tape, preferably in a plane perpendicular to the side surfaces. The at least one barrier layer does not reach all the way to the side surfaces. Instead, a strip from which a barrier layer is absent is present between the side surfaces of the sealing tape and the edges of the at least one barrier layer facing those side surfaces respectively. If the at least one barrier layer is centered, the strips which are formed on either side between the at least one barrier layer and the associated side surface are of equal width.

In an alternative embodiment, the at least one barrier layer is arranged off-center between the side surfaces. Consequently, the two strips formed on either side between the at least one barrier layer and the associated side surfaces are of different widths in the functional direction of the sealing tape.

In another alternative embodiment, the at least one barrier layer begins at one side surface and extends toward the opposite side surface. In this case, one edge of the at least one barrier layer coincides with a side surface of the sealing tape, so that no strip not covered by a barrier layer is present there. A strip not comprising a barrier layer is formed again between the barrier layer and the opposite side surface.

In one embodiment, the sealing tape comprises at least two barrier layers, which are arranged one above the other in the thickness direction of the sealing tape, wherein the barrier layers proceed from alternating side surfaces toward the opposite side surface, as a result of which a sealing tape with a meander-like configuration in the thickness direction is formed.

The at least one barrier layer can also be formed out of a plurality of barrier layer sections, which preferably are distributed in a plane over the cross section of the sealing tape. For example, several strips of barrier layer material can be applied a certain distance apart to the top surface of a foam ply before another foam ply is applied to this top surface and bonded to it.

The sealing tape can also comprise a plurality of barrier layers which are arranged one above the other in the thickness direction of the sealing tape. The barrier layers can all be configured and arranged in accordance with one of the previously described embodiments. The barrier layers, however, can also be configured and arranged in different ways within a sealing tape. For example, one barrier layer can be centered between the side surfaces, whereas a barrier layer above it can be arranged off-center, and a barrier layer lying underneath can be continuous.

It can be seen that there are many different ways in which the at least one barrier layer can be configured and arranged within the sealing tape or sealing tape roll in order to influence in any way desired the water vapor diffusion properties of the sealing tape and the process for producing the sealing tape.

The sealing tape to be used for the sealing tape roll can be produced very easily. For example, any desired number of foam plies and barrier layers can be laminated to each other in alternation to produce a suitable sealing tape. This is especially easy if the at least one barrier layer is arranged so that it is parallel to the bottom surface and perpendicular to the side surfaces of the sealing tape.

The sealing tape preferably comprises a barrier layer which is centered between the top surface and the bottom surface. Accordingly, the foam plies arranged above and below the one barrier layer then have the same dimensions, so that the diffusion of water vapor in the functional direction through the individual foam plies and thus through the sealing tape sections formed by the barrier layer is as uniform as possible.

In one embodiment, the at least one barrier layer, when the sealing tape is in an unwound state, is arranged at a slant to the side surfaces. In this case, the at least one barrier layer is therefore arranged at a slant to the top surface and to the bottom surface of the sealing tape. Therefore, the at least one barrier layer influences the diffusion of water vapor within the sealing tape not only in the thickness direction but also in the functional direction.

In one embodiment, the sealing tape comprises a plurality of barrier layers, which are distributed between the top surface and the bottom surface of the sealing tape. It is particularly preferred that the plurality of barrier layers be distributed uniformly over the thickness of the sealing tape between the top surface and the bottom surface of the sealing tape. In this way, even smaller sections of the sealing tape can be formed, each of which is separated from the next by a barrier layer. The effects of inhomogeneities in the foam on water vapor diffusion within the sealing tape therefore become even more localized. In addition, the foam plies have a uniform configuration, and the diffusion of water vapor through the sealing tape in the functional direction proceeds uniformly.

To limit the sections which are affected by inhomogeneities of the foam even more, the sea ng tape can also comprise a plurality of interior barrier layers which extend in a plane perpendicular to the longitudinal direction of the sealing tape and thus parallel to the functional direction of the sealing tape. As a result, these barrier layers form a plurality of sealing tape sections which are arranged in a row in the longitudinal direction of the sealing tape and between which a barrier layer is arranged in each case. The diffusion of water vapor in the longitudinal direction within the sealing tape can thus be prevented or influenced by these barrier layers. The barrier layers are preferably perpendicular to the side surfaces and perpendicular to the bottom surface of the sealing tape.

To enhance the effect even more, the sealing tape, in one possible embodiment of the sealing tape roll, may also comprise barrier layers which preferably cover at least one side surface of the sealing tape and/or are arranged in the interior of the sealing tape parallel to the side surfaces and extend in the longitudinal direction of the sealing tape. Such interior, longitudinally-extending barrier layers divide the sealing tape into a plurality of sealing tape strips arranged next to each other transversely to the longitudinal direction. These barrier layers prevent or influence the diffusion of water vapor within the sealing tape and through the sealing tape in the functional direction of the sealing tape.

In an advantageous embodiment, the sealing tape comprises a drainage layer for collecting and effectively discharging water from the sealing tape. Water which arrives in the sealing tape undesirably as a result of driving rain, for example, can thus be conducted back out of the sealing tape. A wet sealing tape or a wet region of the sealing tape would lead to a disadvantageous increase in thermal conductivity and correspondingly to a lower degree of thermal insulation by the sealing tape. The drainage layer can comprise a foam strip or can be formed by a barrier layer, preferably a barrier layer parallel to the side surfaces of the sealing tape.

For example, a barrier layer can be configured with multiple plies, wherein one ply forms a drainage layer, which is adapted to conducting intruding water away. The drainage layer can comprise, for example, a membrane or a nonwoven layer. The drainage layer, however, can also be formed by a foam. The sealing tape then, for example, comprises at least three sealing tape strips arranged next to each other transversely to the longitudinal direction, wherein at least one of these sealing tape strips, preferably an inner sealing tape strip, is configured as a drainage layer. The drainage layer then comprises an at least predominantly open-cell foam, which takes up water and can conduct it away through the open pores by the force of gravity. At the same time, through the use of a foam, the insulating properties of the sealing tape suffer almost no negative effect. In addition, the drainage layer can also comprise a nonwoven layer here as well.

It is particularly preferred that the barrier layers described herein are formed by a film-like material or an adhesive, in particular by a film strip, an adhesive strip, or an adhesive-like fluid medium. Such barrier layer materials can be applied and bonded easily to the foam or foam plies of the sealing tape, and they can be inspected easily. In addition, these materials are particularly suitable for use as barrier layer material because their sealing properties can be effectively adjusted as desired.

For example, the barrier layers described herein are formed by a film-like material, by a film of polyamide, polyurethane, polypropylene, or copolymers thereof. The barrier layers described herein can also be formed by an adhesive, e.g., a dispersion adhesive, in particular an acrylate adhesive. All barrier layers can consist of the same material or can consist of different materials.

The barrier layers can also be configured with the property of "humidity variability"; that is, their resistance to the diffusion of water vapor changes as a function of the atmospheric humidity of the environment of the barrier layer. The so-called "sD" value is characteristic of the water vapor diffusion resistance; it is the water vapor diffusion value relative to the thickness of a layer of air in meters.

A barrier layer preferably has an sD value in the range of 0.05-100 m, more preferably of 0.1-25 m or of 0.2-15 m (at 25% relative humidity (RH)). Verifying the sD value is carried out in accordance with DIN EN ISO 12572:2001. Independently of this or combination with it, a barrier layer can have an sD value of 0.02-10 m or of 0.03-6 m or of 0.05-2 m at 72.5% RH according to DIN EN ISO 1 572: 2001. For example, the sD value can be in the range of 1-10 m at 25% RH and in the range of 0.1-5 m 72.5% RH. Unless otherwise specified by DIN EN ISO 12572:2001, the sD values are based on a temperature of 20° C.

The sD value of a barrier layer at 25% RH preferably differs from the sD value at 72.5% RH (at 20° C. in each case) by a factor of ≥1.1-1.2, preferably of ≥1.5-2, possibly up to a factor of 3-5 or of up to 10-20 or even up to 50 or up to 100 or 150 or more. In this way, the dependence of the water vapor diffusion of the barrier layer on the atmospheric humidity is defined. The difference between the two sD values of the barrier layer at the two indicated relative humidities can be ≥0.25 m or ≥0.5 m or preferably ≥0.75-1 m; it can, for example, be up to 5-10 m or up to 20-25 m or more. As a result, an adequate dependence of the water vapor diffusion resistance, i.e., a dependence sufficient to ensure adequate adaptation of the water vapor diffusion resistance to the environmental conditions, can be achieved even under widely varying environmental conditions, such as in summer or in winter or in different climate zones. The sD value at 25% RH is preferably higher in each case than the value at 72.5% RH.

The barrier layers may preferably consist at least partially of a synthetic, water-swellable polymer.

A barrier layer comprises a thickness between 1 μm and 1 mm, preferably a thickness of 1-500 μm of 2-250 μm, more preferably a thickness in the range of 5-100 μm or of 5-50 μm.

The barrier layers can also be configured with multiple plies, in particular as a multi-ply composite layer. For example, at least one ply of at least one additional material can be arranged on one or both sides of a functional layer. The one additional ply or both additional plies, each of which covers the functional layer either partially or completely, can protect this layer, carry or support it, and increase the stability of the barrier layers. The individual plies can consist of the same material or of different materials.

The plies arranged on one or both sides can be in particular nonwovens, fabric, or mesh of inert materials such as polyethylene, polyurethane, polypropylene, polyester, glass fibers, or viscose, possibly even perforated films, in particular films of polyethylene, polyurethane, polypropylene, or polyester. The layers can generally consist of any suitable material which is available in the form of layers and the sD value of which is preferably not higher than that of the functional layer. The plies arranged on one or both sides can consist of a dispersion adhesive, in particular of an acrylate adhesive.

The thickness of the layers enclosing the functional layer of the barrier layers can have, per side and independently of each other, an overall thickness of 10-2,000 µm, preferably of 10-500 µm, more preferably of 10-250 µm or of 10-90 µm.

Generally, the barrier layers preferably form a continuous, nonporous, and non-perforated layer, which preferably is at least substantially impermeable to air. The air permeability of the barrier layers or barrier plies is preferably in the range of 0.01-50 $l/(m^2s)$, more preferably in the range of 0.01-20 $l/(m^2s)$. In a preferred embodiment, the air permeability is ≤3-6 $l/(m^2s)$ or preferably ≤1-2 $l/(m^2s)$ or more preferably ≤0.2-0.5 $l/(m^2s)$ or particularly preferably ≤0.1-0.3 $l/(m^2s)$ according to DIN EN ISO 9237; test area=100 $cm^2$ at a measurement pressure (negative pressure) of 1.0 mbar; test unit: Frank 21443); or is not measurable anymore.

The crucial point with respect to the permeability of a sealing tape section to air is generally the overall reduction of the air flow in one direction across the entire cross section of the sealing tape section. If, for example, a plurality of barrier layers and sealing tape plies or strips are arranged in alternation in the thickness direction or in the functional direction of the sealing tape, the reduction of the air flow through all these barrier layers and sealing tape strips must be taken into account. The air permeability of the overall sealing tape in the functional direction is preferably less than 50 $l/(m^2s)$, more preferably less than 30 $l/(m^2s)$, under the above-indicated measurement conditions.

In one embodiment, the sealing tape or the sealing tape roll also comprises an additional material, which is applied to a surface of the sealing tape or to a barrier layer or is contained in the impregnation agent of the foam. The additional material can give the sealing tape special properties. Additional materials which can be considered for use include in particular materials for fire protection (e.g., expandable graphite, incombustible solids, $CO_2$ emitters, etc.), materials for insulation (e.g., polyurethane foam, resins, sealants, etc.), materials for sealing against moisture (e.g., hydrophobic or hydrophilic substances, substances which swell upon contact with water, etc.), materials for sound damping, materials for controlled venting (e.g., catalysts, etc.), materials for hygienic purposes (e.g., disinfectants, etc.), and/or materials for initiating the expansion of the sealing tape (e.g., blowing agents, heat sources, etc.). With respect to the arrangement, the type, and the properties of the additional material, the skilled person will be familiar with alternatives which can be used to satisfy the requirements in a specific case.

The foam of the sealing tape can be made of any desired open-cell or closed-cell flexible foam such as that made of polyurethane, polyethylene, polyvinyl chloride, or polypropylene, and it can be impregnated to delay its recovery after compression. The density of these types of flexible foams is in the range of 20-200 $kg/m^3$.

The individual foam plies of the sealing tape preferably consist of the same material. Alternatively, the foam plies can be made out of different materials.

The flexible foam preferably comprises a compression hardness of more than 2 kPa. The compression hardness is preferably more than 2.1 kPa, more preferably more than 2.2 kPa, and even more preferably more than 2.3 kPa. The compression hardness is preferably less than 4 kPa, more preferably less than 3.8 kPa, and even more preferably less than 3.6 kPa. The compression hardness is a measure of the strength of the foam. The values given herein are based on a compression of 40% versus the original thickness. The compression hardness is determined according to DIN EN ISO 3386; the CV40 value is given.

The sealing tapes are preferably impregnated at least partially and preferably completely with an impregnation agent to delay their recovery. The impregnation agent preferably comprises an acrylate dispersion. In an advantageous embodiment, the acrylate dispersion comprises acrylate polymer particles dispersed in a homogeneous phase. It is particularly preferable for the foam to be impregnated with a certain weight-percentage of acrylate dispersion for delayed recovery in such a way that, at 20° C. and 50% relative humidity, the sealing tape expands from a sealing tape compression of about 9-13% to the point where it seals the joint n less than 24 hours.

A foam which has been impregnated to delay its recovery preferably comprises an air permeability in the range of 50-1,000 $l/(m^2s)$, more preferably in the range of 60-600 $l(m^2s)$, and even more preferably in the range of 80-400 $l/(m^2s)$. The data on air permeability given within the scope of the present application are based on determinations according to DIN ISO 9237 under the standard conditions of a 10-mm-thick foam piece (completely expanded) at a negative measurement pressure of 1.0 bar over a test surface of 100 $cm^2$ by the use of a Frank 21443 device.

Finally, it is advantageous for the bottom surface of the sealing tape to comprise an adhesive layer for attaching the sealing tape to a frame element. The adhesive layer will therefore be arranged parallel to the at least one barrier layer. In the state, in which the sealing tape is wound up into a roll, the bottom surface of the sealing tape is oriented radially outwardly. The sealing tape can thus be unrolled along a frame element and be rapidly attached to it by adhesive layer. The adhesive layer is preferably configured as double-sided adhesive tape, which is covered on the external side by a peel-off protective film. The adhesive layer can also, in addition or alternatively, be configured on the top surface of the sealing tape. The sealing tape can, by the adhesive layer, also be attached to the building wall instead of to the frame element.

DETAILED DESCRIPTION OF SPECIFIC EMBODIMENTS

Figure 1:
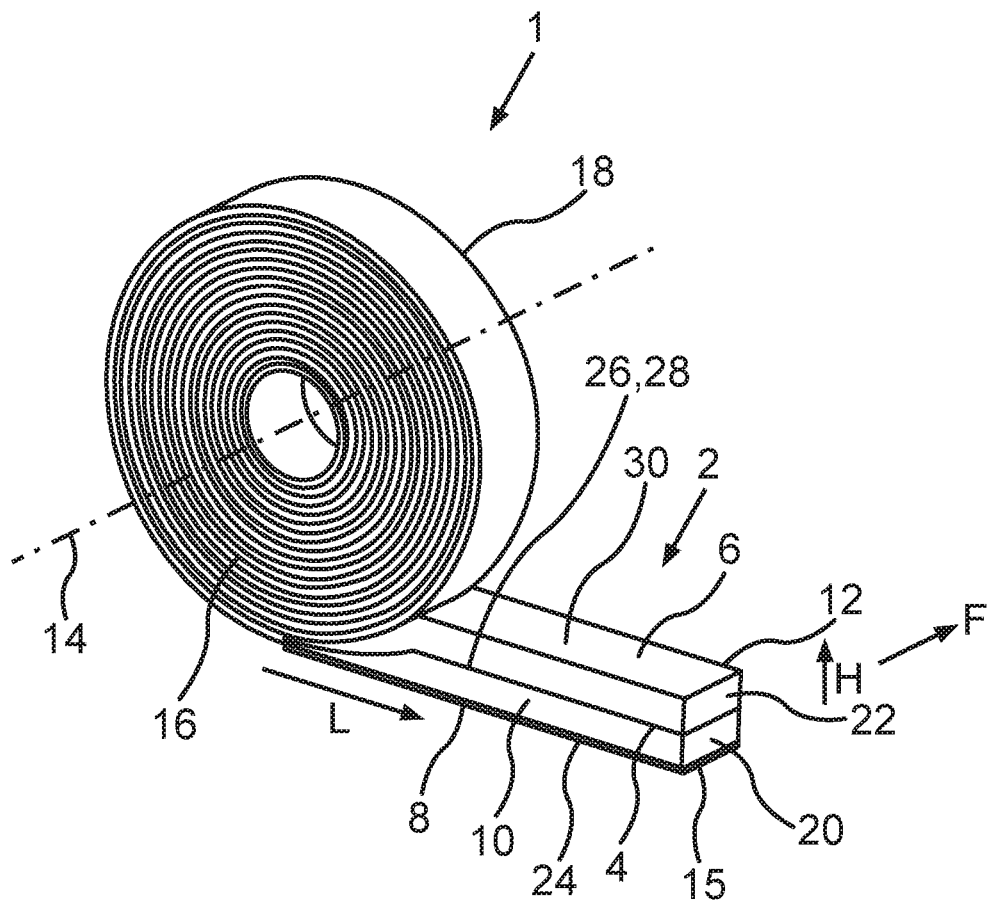
FIG. 1 shows an isometric view of an embodiment of a sealing tape roll according to the invention.

FIG. 1 shows an isometric view of an embodiment of a sealing tape roll 1 according to the present invention. The sealing tape roll 1 comprises a wound-up sealing tape 2. The sealing tape 2 in FIG. 1 is shown in a state in which it has been partially unwound so that its components can be more easily seen, wherein it is the end of the sealing tape 2 at the outer end of the sealing tape roll 1 which has not been wound up onto the sealing tape roll 1. As can be seen, the sealing tape 2 has been wound up into the sealing tape roll 1 under compression so that the sealing tape roll 1 takes up less room when stored. The sealing tape 2 can be impregnated to delay its recovery. The part of the sealing tape 2 not wound up into the sealing tape roll 1 is shown in the fully expanded state in FIG. 1. A thickness of the sealing tape 2 in the expanded state is usually 2-times to 20-times the thickness of the sealing tape 2 in the compressed state of the sealing tape roll 1.

The sealing tape 2 consists of flexible, compressible foam and comprises at least one internal barrier layer 4. In the embodiment shown, the sealing tape 2 comprises exactly one barrier layer 4. The sealing tape 2, however, can also comprise a plurality of barrier layers 4. In addition, the sealing tape 2 comprises a top surface 6, a bottom surface 8, and two side surfaces 10, 12 connecting the top surface 6 and the bottom surface 8 to each other. A longitudinal direction L of the sealing tape 2 is parallel to the bottom surface 8 and to the side surfaces 10, 12. In the unwound state of the sealing tape 2, the tape lies on a flat surface, for example, on an external surface of a frame element, wherein, in this state, the side surfaces 10, 12 are perpendicular to the top surface 6 and to the bottom surface 8, and the sealing tape 2 is in a completely expanded state. In the compressed state of the sealing tape 2, the side surfaces 10, 12 are shorter than they are in the expanded state of the sealing tape 2. That is, the distance between the top surface 6 and the bottom surface 8 in the compressed state is less than in the expanded state. The distance between the side surfaces 10, 12 remains substantially unchanged upon compression of the sealing tape 2.

The sealing tape 2 is wound up into the sealing tape roll 1 around an axis 14, which is perpendicular to the longitudinal direction L and perpendicular to the side surfaces 10, 12 of the sealing tape 2. In the sealing tape roll 1, the top surface 6 of one turn rests against the bottom surface 8 of an adjacent turn of the sealing tape roll 1, and the side surfaces 10, 12 of the sealing tape 2 form end surfaces 16, 18 of the sealing tape roll 1. The bottom surface 9 is oriented radially toward the outside relative to the axis 14 or to the sealing tape roll 1, whereas the top surface 6 of the sealing tape 2 is oriented radially toward the inside. A circumferential surface of the sealing tape roll 1 therefore comprises the bottom surface 8 of the outermost turn of the sealing tape 2 of the sealing tape roll 1.

The bottom surface 8 of the sealing tape 2 preferably comprises an adhesive layer 15 for attaching the sealing tape 2 to a frame element. For example, adhesive layer 15 can be formed by double-sided adhesive tape, which is fastened to the bottom surface 8 of the sealing tape 2 by an adhesive surface. An opposite adhesive surface of the adhesive tape, i.e., the surface facing away from the bottom surface 8, is covered by a cover layer to protect the adhesive surface and to prevent the individual turns of the sealing tape roll 1 from sticking to each other. To install the sealing tape 2, this cover layer must be peeled off the adhesive layer in sections, and the sealing tape roll 1 is then unrolled along an external surface of a frame element. The cover layer consists, for example, of silicone paper. The bottom surface 8 of the sealing tape 2 is bonded to the frame element by the adhesive layer 15. It is also possible to cut off sealing tape strips of the required length from the sealing tape roll 1 first and then to fasten them to the frame element.

As can be derived from FIG. 1, the at least one barrier layer 4 extends between the side surfaces 10, 12 of the sealing tape roll 1 and in the longitudinal direction L of the sealing tape 2. In the embodiment shown, the sealing tape 2 comprises a first and a second foam ply 20, 22, which are arranged one above the other in a thickness direction of the sealing tape 2. The thickness direction H is perpendicular to the bottom surface 8 and parallel to the side surfaces 10, 12 of the sealing tape 2. Thus the thickness direction H is perpendicular to the longitudinal direction L. As can be seen clearly in FIGS. 2a-2d, the functional direction F is perpendicular to the side surfaces 10, 12 and thus perpendicular to both, the longitudinal direction L and the thickness direction H. The at least one barrier layer 4 preferably extends in the functional direction F and in the longitudinal direction L of the sealing tape 2.

The bottom surface 8 of the sealing tape 2 comprises a bottom surface 24 of the first foam ply 20. A top surface 26 of the first foam ply 20 is provided with the barrier layer 4. The barrier layer 4 can, for example, be laminated onto the first foam ply 20. The second foam ply 22 is applied to the top surface 26 of the first foam ply 20 or to the barrier layer 4, so that the top surface 26 of the first foam ply 20 faces the bottom surface 28 of the second foam ply 22. The top surface 6 of the sealing tape 2 then comprises the top surface 30 of the second foam ply 22. An additional barrier layer 4 and an additional foam ply can be applied to the top surface 30 of the second foam ply 22. In this way, sealing tapes 2 with any desired number of foam plies and barrier layers can be formed.

In the preferred embodiment shown here, the barrier layer 4 extends continuously from one side surface 10 to the opposite side surface 12 of the sealing tape 2 and thus, in the wound-up state, continuously from one end surface 16 to the opposite end surface 18 of the sealing e roll 1. Alternative embodiments are described with reference to FIGS. 2a-2d. In the preferred embodiment, the at least one barrier layer 4 is parallel to the bottom surface 8 of the sealing tape 2 and perpendicular to its side surfaces 10, 12 to simplify production and to separate the two foam plies 20, 22 as completely as possible form each other.

The barrier layer 4, however, does not have to extend completely between the side surfaces 10, 12 or the end surfaces 16, 18 of the sealing tape roll 1. In alternative embodiments, the at least one barrier layer 4 extends only part of the way between the side surfaces 10, 12 of the sealing tape 2 or between the end surfaces 16, 18 of the sealing tape roll 1. In order to nevertheless obtain the desired influence on the diffusion of water vapor in the thickness direction H of the sealing tape 2 between the foam plies 20, 22 and to suppress it as completely as possible, the at least one barrier layer 4 extends over at least 50% of the width of the sealing tape roll 1 between the opposite end surfaces 16, 18 of the sealing tape roll 1. The width of the sealing tape roll 1 is defined as the perpendicular distance between the end surfaces 16, 18, i.e., in the direction of the axis 14 of the sealing tape roll 1. The width of the sealing tape 2 is defined as the perpendicular distance between the side surfaces 10, 12 of the sealing tape 2, i.e., in the functional direction F of the sealing tape 2. The width of the sealing tape roll 1 is substantially the same as the width of the sealing tape 2.

It is obvious that, the farther the barrier layer 4 extends over the cross section of the sealing tape between the opposite end surfaces 16, 18 of the sealing tape roll 1 or between the side surfaces 10, 12 of the sealing tape 2, the more effectively the diffusion of water vapor in the thickness direction H can be influenced. It is therefore preferred that the at least one barrier layer 4 extends over at least 75% of the width, even more preferably over at least 90% of the width, of the sealing tape roll 1 between the opposite end surfaces 16, 18 of the sealing tape roll 1.

FIGS. 2a-2d show cross sections through part of a building to illustrate various embodiments of a sealing tape 2 of a sealing tape roll 1 and an installed state of the sealing tape 2. The part of the building shown here comprises a wall 32, a frame element 34, and a sealing tape 2. The frame element 34 is inserted into a masonry opening in the wall 32 of the building. A joint 36 is formed between the facing surfaces, i.e., between a surface of the building wall 32 or of the masonry opening and a surface of the frame element 34. The joint 36 extends peripherally around the frame element 34 and extends between the interior side 38 of the room and the exterior side 40 of the room. The joint 36 is to be sealed by the sealing tape 2. To simplify its installation, the sealing tape 2 is preferably attached to the frame element 34 even before the frame element 34 has been inserted into the masonry opening. For this purpose, the bottom surface 8 of the sealing tape comprises an adhesive layer 15, by which the sealing tape 2 is attached to the external side of the frame element 34 facing the joint 36. Alternatively, the bottom surface 8 of the sealing tape 2 could also be attached to the surface of the building wall facing the joint 36.

In its installed state, the sealing tape 2 lies flat by its bottom surface 8 on the frame element 34 or the building wall 32 and lies flat by its top surface 6 correspondingly on the other element, i.e., the frame element 34 or the building wall 32. In this state, the sealing tape 2 is partially compressed to guarantee full contact with the frame element 34 and the building wall 32. One side surface 10 faces the interior side 38 of the room, and the opposite side surface 12 faces the exterior side 40 of the room. The sealing tape 2 extends in the longitudinal direction L (perpendicular to the plane of the drawing) around the frame element 34. In contrast to conventional sealing tapes, the at least one barrier layer 4, however, extends in a plane from the interior side 38 to the exterior side 40 of the room and parallel to the longitudinal direction L of the sealing tape 2, preferably also parallel to the functional direction F. The at least one barrier layer 4 thus produces substantially no insulating or sealing effect between the interior side 38 and the exterior side 40 of the room in the functional direction F of the sealing tape 2. In contrast, the barrier layers of conventional sealing tapes extend from the frame element 34 to the building wall 32 across the entire cross section of the joint, i.e., from the bottom surface 8 to the top surface 6 and parallel to the side surfaces 10, 12 of the sealing tape 2 and thus seal off the interior side against the exterior side of the room. Such barrier layers can also be provided in addition to the at least one barrier layer 4.

Figure 2A:
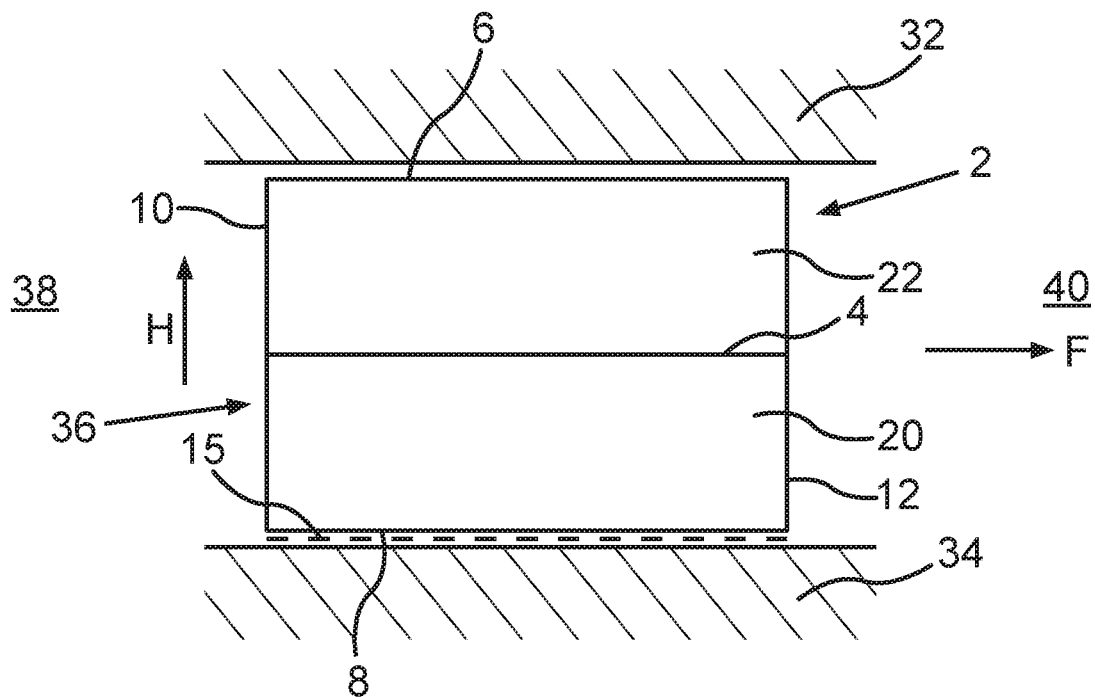
FIGS. 2a-2d show cross-sectional views of various embodiments of a sealing tape of a sealing tape roll according to the invention in the installed state.

In the embodiment shown in FIG. 2a, the sealing tape 2 comprises exactly one barrier layer 4, which is perpendicular to the side surfaces 10, 12 of the sealing tape 2 and extends continuously from the side surface 10 to the side surface 12. Because the barrier layer 4 is perpendicular to the side surfaces 10, 12, it has no effect on the diffusion of water vapor in the functional direction F of the sealing tape 2. In the thickness direction H of the sealing tape 2, the barrier layer 4 separates the first foam ply 20 from the second foam ply 22, which are arranged one above the other in the thickness direction H. The diffusion of water vapor within the sealing tape 2 in the thickness direction H between the first foam ply 20 and the second foam ply 22 can therefore occur only through the barrier layer 4. As a function of the water vapor diffusion resistance of the barrier layer 4, therefore, there is little or no diffusion of water vapor in the thickness direction H—only as much as the barrier layer 4 allows. The greater the water vapor diffusion resistance of the barrier layer 4, the less the diffusion of water vapor in the thickness direction H. To obtain a sealing tape 2 which is as uniform as possible with respect to its other insulating and sealing properties, the barrier layer 4 is preferably arranged symmetrically between the top surface 6 and the bottom surface 8. As a result, the first foam ply 20 and the second foam ply 22 have substantially the same dimensions. The barrier layer 4, however, can also be arranged asymmetrically between the top surface 6 and the bottom surface 8 of the sealing tape 2. The sealing tape 2 can also comprise a plurality of barrier layers 4, which are distributed over the thickness of the sealing tape 2 between the top surface 6 and the bottom surface 8 of the sealing tape and which subdivide the sealing tape 2 into a plurality of foam plies.

Figure 2B:
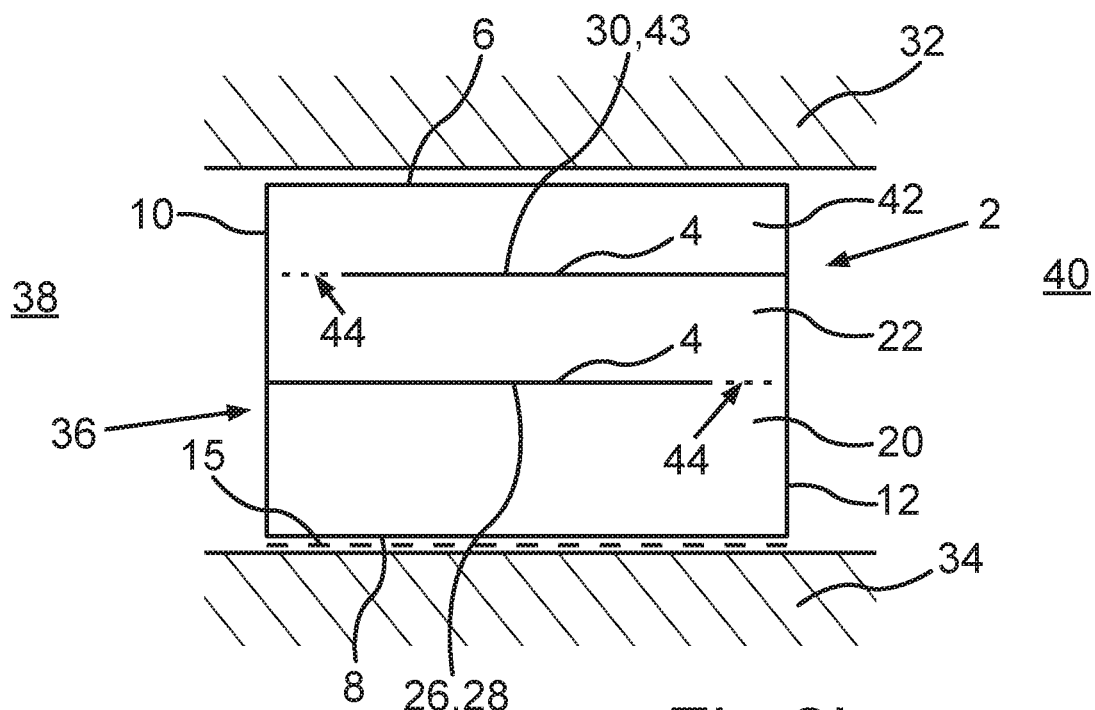

In the embodiment according to FIG. 2b, the sealing tape 2 comprises a total of three foam plies, wherein a barrier layer 4 is present between each of the adjacent plies. It is obvious that sealing tapes 2 with any desired number of foam plies and barrier layers can be formed in this way, to which the statements presented herein are to be applied in corresponding fashion. In the embodiment shown, the sealing tape 2 comprises the first foam ply 20, the second foam ply 22, and a third foam ply 42. A respective barrier layer 4 is arranged between the facing surfaces of each of the adjacent foam plies 20, 22, 42. A barrier layer 4 is arranged between the top surface 26 of the first foam ply 20 and the bottom surface 28 of the second foam ply 22, and another barrier layer 4 is arranged between the top surface 30 of the second foam ply 22 and the bottom surface 43 of the third foam ply 42.

According to an aspect of the present invention, each of the barrier layers 4 extends over at least 50% of the width of the sealing tape 2 between the opposite side surfaces 10, 12 of the sealing tape 2 and in the longitudinal direction L of the sealing tape. It is preferred in this exemplary embodiment as well that the foam plies 20, 42 have substantially the same dimensions, so that the barrier layers 4 are distributed uniformly over the thickness of the sealing tape 2 between the top surface 6 and the bottom surface 8. The foam plies 20, 22, 42, however, can also have different dimensions, in particular different thicknesses or heights in the thickness direction, so that the barrier layers 4 are distributed nonuniformly between the top surface 6 and the bottom surface 8 of the sealing tape 2. It, is preferred that the barrier layers 4 be substantially perpendicular to the side surfaces 10, 12. In the embodiment shown here, the barrier layers 4 extend over only a part of the width of the sealing tape 2 between the side surfaces 10 and 12. Each of the barrier layers 4 begins at one of the side surfaces 10, 12 and proceeds toward the other side surface 10, 12. One edge of the barrier layer 4 thus coincides with one of the side surfaces 10, 12, whereas the opposite edge in the functional direction F is a certain distance away from the respective opposite side surface 10, 12. Accordingly, a strip 44 (shown in broken line) without a barrier layer is formed between the edge of the barrier layer 4 facing the opposite side surface 10, 12 and that opposite surface 10, 12.

If the sealing tape 2 is formed out of individual foam plies 20, 22, 42, which are separate from each other before the tape is formed, the strip 44 can be formed by an air gap or by adhesives between the adjacent foam plies 20, 22, 42 or by a combination thereof. If the sealing tape 2 is formed out of a single foam strip into which cuts have been introduced, and if the barrier layers 4 are inserted into these cuts, the strip 44 can also consist of a continuous foam bridge between the edge of a barrier layer 4 facing the side surface 10, 12 and this side surface 10, 12. It is obvious that, in the area of the strips 44 in which no barrier layer 4 is present between the foam plies 20, 22, 42, it is possible for water vapor to diffuse in the thickness direction H within the sealing tape 2 with substantially no hindrance.

Accordingly, the strips 44 are to be made as small as possible. It is therefore preferred that each of the barrier layers 4 extends over at least 50%, preferably over at least 75%, and even more preferably over at least 90%, of the width of the sealing tape 2 between the side surfaces 10, 12. A strip 44 preferably has a width of no more than 5 mm, more preferably of no more than 2 mm, and even more preferably of no more than 1 mm. The barrier layers 4 can also be configured here as well to extend continuously from one side surface 10 to the other side surface 12.

To make it more difficult for water vapor to diffuse freely in the thickness direction H through the entire sealing tape 2, the barrier layers 4 in this embodiment extend in alternation, first from one of the side surfaces 10, 12 toward the opposite side surface 10, 12 and then from the other side surface. For example, one strip 44 between the first foam ply 20 and the second foam ply 22 is arranged in the area of the right side surface 12, whereas a strip 44 between the second foam ply 22 and the third foam ply 42 is arranged in the area of the left side surface 10.

Figure 2C:
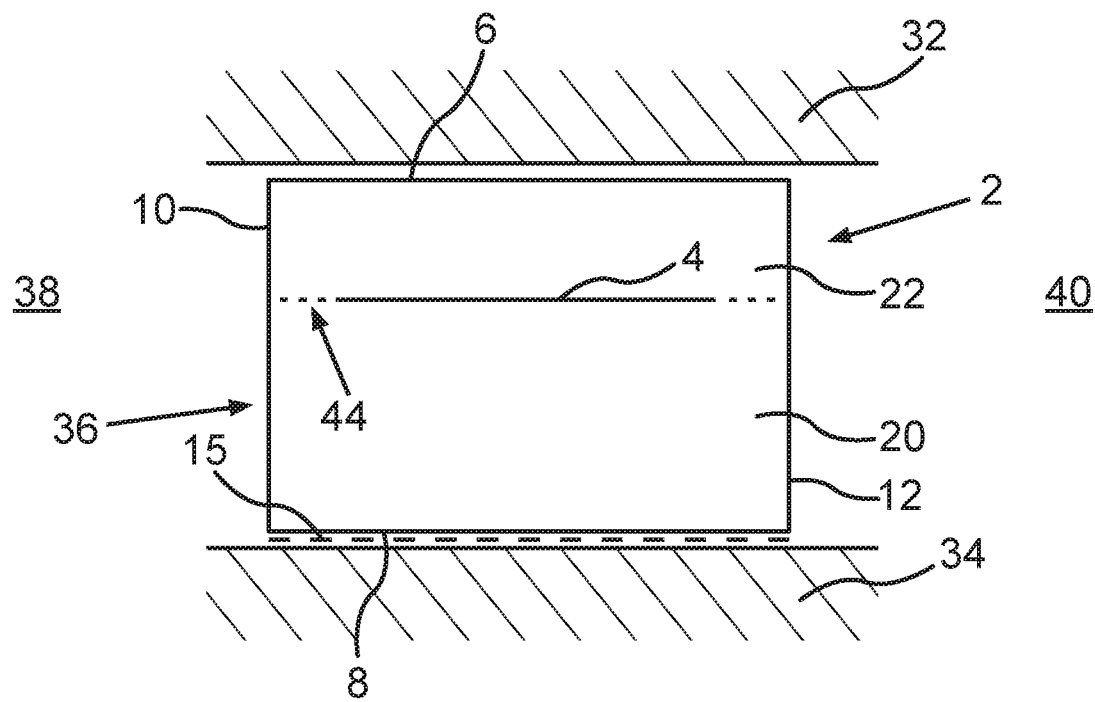

FIG. 2c shows air exemplary embodiment in which the sealing tape 2 comprises at least one barrier layer 4, which extends only part of the way between the side surfaces 10, 12 and is centered between the side surfaces 10, 12. The sealing tape 2 can also comprise a plurality of such barrier layers 4 or of barrier layers 4 according to another embodiment, these layers being distributed over the thickness of the tape. A strip 44 without a barrier layer 4 is formed between the edges of the barrier layer 4 facing the side surfaces 10, 12 on both sides of the barrier layer 4. The strips 44 are in this case of equal width. This barrier layer 4 also extends over at least 50% of the width of the sealing tape, preferably over at least 75%, and even more preferably over at least 90% of the width. As indicated in FIG. 2c, the barrier layer 4 in this exemplary embodiment is not arranged symmetrically between the top surface 6 and the bottom surface 8 but instead is closer to the top surface 6 of the sealing tape 2. Accordingly, the thickness of the first foam ply 20 is greater than the thickness of the second foam ply 22, wherein the size ratio of the foam plies can be adapted in any way desired. The barrier layer 4 according to this embodiment, however, can also be arranged symmetrically between the top surface 6 and the bottom surface 8 of the sealing tape 2.

One or more barrier layers 4 can also be arranged off-center between the side surfaces 10, 12 of a sealing tape 2. Accordingly, a strip 44 between the edge of the barrier layer 4 facing one of the side surfaces 10, 12 will be smaller than the other strip 44 located between the opposite edge of the barrier layer 4 and the opposite side surface 10, 12.

Figure 2D:
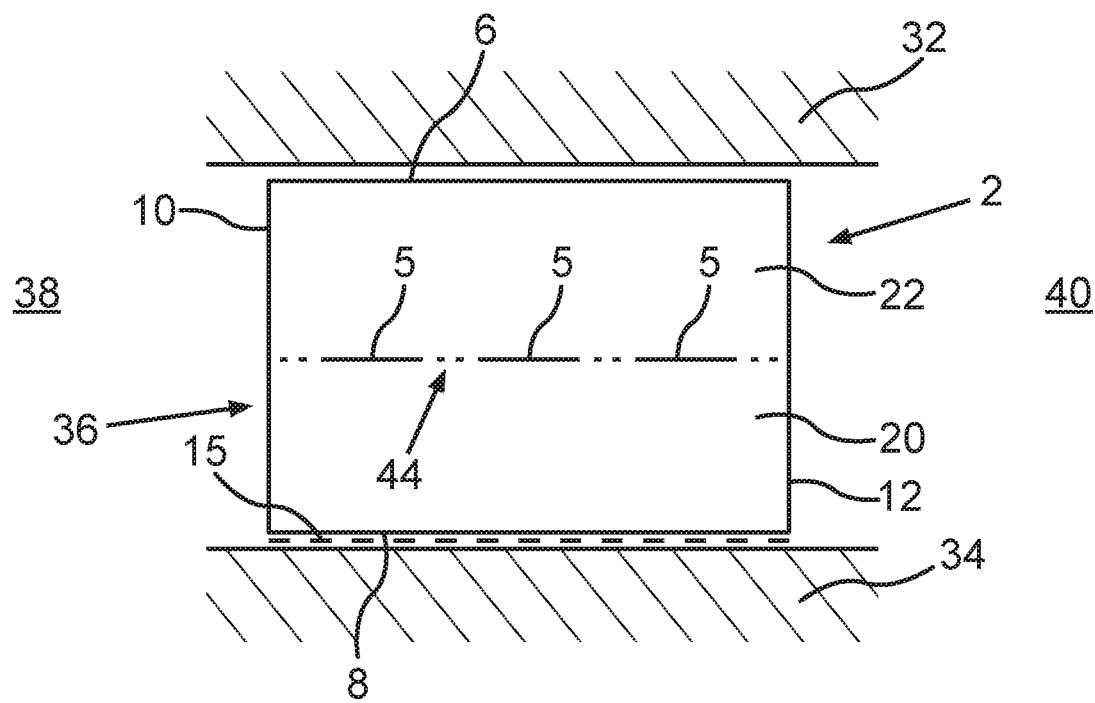

FIG. 2d shows an embodiment of the sealing tape 2 in which the at least one barrier layer 4 is formed of a plurality of barrier layer sections 5, which are distributed in a plane over the cross section of the sealing tape 2. The number and size (particularly the width) of the barrier layer sections 5 can be selected as desired. The barrier layer sections 5 preferably lie in a plane parallel to the top surface 6 and to the bottom surface 8 of the sealing tape, i.e., perpendicular to the side surfaces 10, 12. In sum, the barrier layer sections 5 extend over at least 50%, preferably over at least 75%, more preferably over at least 90%, of the width of the sealing tape 2. The barrier layer sections 5 can be distributed uniformly or nonuniformly over the width of the sealing tape 2 between the side surfaces 10, 12. Between two adjacent barrier layer sections 5, a strip 44 is formed, which has no barrier layer 4. The barrier layer sections 5 can, for example, be produced by applying strips of barrier layer material extending in the longitudinal direction of the plies to the top surface 26 of the first foam ply 20 and then by bonding the second foam ply 22 to the first foam ply 20.

Based on the embodiments described herein, the skilled person will envision a plurality of many other configurations which a sealing tape roll 1 according to an aspect of the invention can assume. In particular, the sealing tape 2 of the sealing tape roll 1 can have any desired number of barrier layers 4, wherein different embodiments as previously described can be combined with each other within a sealing tape 2. In all of the embodiments, the barrier layers 4 can also be oriented at a slant to the side surfaces, as a result of which they also exert an influence on the diffusion of water vapor in the functional direction F. The barrier layers 4, however, extend in all cases over at least 50% of the width of the sealing tape 2.

It is obvious that the discussion of the sealing tapes and barrier layers presented here applies to all of the embodiments described herein, and that individual features of the various embodiments can be combined with each other in any way desired.

The invention claimed is:

1. A sealing tape roll of a sealing tape of flexible, compressible foam with at least one interior barrier layer;
   wherein the sealing tape comprises a top surface, a bottom surface, two side surfaces connecting the top surface and the bottom surface to each other, a longitudinal direction, which is parallel to the bottom surface and to the side surfaces, and a thickness direction, which is perpendicular to the bottom surface of the sealing tape;
   wherein the sealing tape is wound up into the sealing tape roll around an axis transverse to the longitudinal direction of the sealing tape in such a way that the top surface of one turn rests against the bottom surface of an adjacent turn of the sealing tape roll, and the side surfaces of the sealing tape form end surfaces of the sealing tape roll, wherein a width of the sealing tape roll is defined as a distance between one end surface and the opposite end surface of the sealing tape roll;
   wherein the sealing tape comprises a plurality of foam plies, which are arranged one above the other in the thickness direction between the bottom surface and the top surface of the sealing tape, wherein a barrier layer is accommodated between each pair of adjacent foam plies;
   wherein the at least one barrier layer extends over at least 50% of the width of the sealing tape roll between the opposite end surfaces of the sealing tape roll and in the longitudinal direction of the sealing tape;
   wherein the at least one barrier layer is formed out of a film strip of polyamide, polyurethane, polypropylene, or copolymers thereof, or formed out of an adhesive strip; and
   wherein the at least one barrier layer comprises a sD value, which is characteristic of a water vapor diffusion resistance of the at least one barrier layer, in the range of 0.05-100 meters.

2. The sealing tape roll according to claim 1 wherein the at least one barrier layer extends between the opposite end surfaces of the sealing tape roll over at least 75% of the width of the sealing tape roll.

3. The sealing tape roll according to claim 1 wherein the at least one barrier layer extends between the opposite end surfaces of the sealing tape roll over at least 90% of the width of the sealing tape roll.

4. The sealing tape roll according to claim 1 wherein the at least one barrier layer is centered between the side surfaces.

5. The sealing tape roll according to claim 1 wherein the at least one barrier layer is arranged off-center between the side surfaces.

6. The sealing tape roll according to claim 1 wherein the at least one barrier layer begins at one of the side surfaces and proceeds toward the opposite side surface.

7. The sealing tape roll according to claim 1 wherein the sealing tape comprises at least two barrier layers, which are arranged one above the other in the thickness direction, and wherein the barrier layers proceed in alternation, first from one of the side surfaces toward the opposite side surface and then from the other one of the side surfaces toward the other opposite side surface.

8. The sealing tape roll according to claim 1 wherein the at least one barrier layer is formed by a plurality of barrier layer sections.

9. The sealing tape roll according to claim 1 wherein the at least one barrier layer extends continuously from one end surface of the sealing tape roll to the opposite end surface of the sealing tape roll.

10. The sealing tape roll according to claim 1 wherein the at least one barrier layer is parallel to the bottom surface.

11. The sealing tape roll according to claim 10 wherein the at least one barrier layer is perpendicular to the side surfaces.

12. The sealing tape roll according to claim 11 wherein the sealing tape comprises a barrier layer, which is arranged symmetrically between the top surface and the bottom surface.

13. The sealing tape roll according to claim 1 wherein, in an unwound state of the sealing tape, the at least one barrier layer is arranged at a slant to the side surfaces.

14. The sealing tape roll according to claim 1 wherein the sealing tape comprises at least two barrier layers, which are distributed uniformly over a thickness of the sealing tape between the top surface and the bottom surface of the sealing tape.

15. The sealing tape roll according to claim 1 wherein the bottom surface of the sealing tape comprises an adhesive layer for bonding the sealing tape to a frame element.

* * * * *